United States Patent [19]

Kooijmans et al.

[11] 4,446,257

[45] May 1, 1984

[54] AQUEOUS COATING POWDER SUSPENSIONS AND THEIR PREPARATION

[75] Inventors: Petrus G. Kooijmans; Wolfgang Kunze, both of Amsterdam, Netherlands

[73] Assignee: Shell Oil Company, Houston, Tex.

[21] Appl. No.: 382,534

[22] Filed: May 27, 1982

Related U.S. Application Data

[63] Continuation of Ser. No. 241,152, Mar. 6, 1981, abandoned.

[30] Foreign Application Priority Data

May 22, 1980 [GB] United Kingdom ............... 8016917

[51] Int. Cl.$^3$ .............................................. C08L 63/00
[52] U.S. Cl. .................................. 523/403; 523/404; 523/417; 523/420
[58] Field of Search ............... 523/403, 404, 417, 420

[56] References Cited

U.S. PATENT DOCUMENTS

| | | | |
|---|---|---|---|
| 3,787,230 | 1/1974 | Hoffman et al. | 112/102 A |
| 3,962,499 | 6/1976 | Brody et al. | 427/386 |
| 4,031,050 | 6/1977 | Jerabek | 260/29.2 TN |
| 4,064,090 | 12/1977 | Gibson et al. | 260/29.4 R |
| 4,100,315 | 1/1978 | Lauterbach | 427/379 |
| 4,129,490 | 12/1978 | Schimmel | 204/181 C |
| 4,134,865 | 1/1979 | Tominaga | 260/18 PN |
| 4,150,006 | 1/1979 | Randenbusch | 260/29.2 EP |
| 4,246,148 | 1/1981 | Shimp et al. | 260/18 EP |

FOREIGN PATENT DOCUMENTS 1235975 6/1971 United Kingdom .
1461832 1/1977 United Kingdom .

*Primary Examiner*—Paul R. Michl
*Attorney, Agent, or Firm*—Norris E. Faringer

[57] ABSTRACT

Aqueous powder suspensions for thermoset coatings are prepared by intimately blending a mixture of (a) an epoxy resin/amine adduct having terminal amino groups,
(b) a curing agent (phenolic resin, aminoplast resin, non-acidic polyester + transesterification catalyst), and, optionally,
(c) a solid epoxy resin, said blend having a softening point of at least 70° C., and milling down in water to a particle size of less than 20 micrometers.

9 Claims, No Drawings

AQUEOUS COATING POWDER SUSPENSIONS AND THEIR PREPARATION

This is a continuation of application Ser. No. 241,152, filed Mar. 6, 1981 abandoned.

FIELD OF THE INVENTION

The invention relates to aqueous powder suspensions of thermosetting coating compositions, to a process for their preparation, and to their use for the application of thermoset coatings on a surface.

BACKGROUND OF THE INVENTION

U.S. Pat. No. 3,787,230 discloses a method for coating an article by applying an aqueous slurry of a powder paint onto the surface. The powder paint is a commercial powder, having an average particle size of 36 micrometers, and the slurry has to be kept homogeneous by agitation during preparation and use. On storage the solid matter of such a slurry will settle, and it is technically unattractive to redisperse it again immediately before use.

Further, U.S. Pat. No. 4,100,315 discloses a method to prepare aqueous coating powder dispersions containing as the binder a solid epoxy resin, which is micronized in water in the presence of a specific combination of surfactants. For many applications, however, the presence of surfactants in the cured coating is not desirable.

Epoxy resin/amine adducts have been used before in aqueous coating compositions, which were mainly intended for cathodic electrodeposition, and in which the amino component was at least partly neutralized with an acid before being diluted with water. The neutralization served to make the amine water-soluble, and also to provide the necessary positive electrical charge on amino groups for cathodic electrodeposition; usually from 20 to 100% of the amine adduct was neutralized. See, for example, British Pat. Nos. 1,235,975 and 1,461,832, U.S. Pat. Nos. 3,962,499 and 4,150,006.

SUMMARY OF THE INVENTION

The present invention provides aqueous coating powder suspensions which are stable on storage, and do not contain any surfactant.

Also, in the present suspensions no addition of acid is needed; the binder components are preferably insoluble in water, and addition of means which will promote water-solubility of components are, in general, undesirable as they can decrease the stability of the aqueous suspensions and thereby their utility for application as surface coating material.

The invention is defined as an aqueous coating powder suspension in which the powder particles comprise an intimate mixture of binder components (a) an epoxy resin/amine adduct having terminal amino groups,
(b) a cross-linking component, and optionally
(c) a solid polyepoxide, the mixture having a softening point of at least 70° C. and the particle size in the suspension being essentially below 20 micrometers.

DESCRIPTION OF THE PREFERRED EMBODIMENT

The first component of the instant aqueous coating powder suspension is an epoxy/amine adduct containing terminal amino groups.

Epoxy compounds react with amines having at least one reactive N—H function according to the general addition reaction

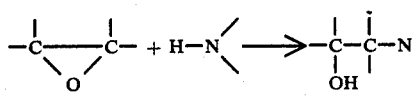

and the qualification "terminal amino groups" in the definition of component (a) means that essentially all epoxy groups in the preparation of the adduct have reacted. It will be clear that the amount of amine or amines used in that preparation must be sufficient to provide at least one N—H function for every epoxy group, and further that cross-linking reactions during the formation of the adduct should be avoided. The latter can be attained by using an amine or amines having two or more N—H functions per molecule in large excess over epoxy groups, or preferably by using at least an amine having one single secondary amine group and no primary amino groups per molecule.

The component (a) in the present suspensions is preferably an adduct of a polyglycidyl ether of a polyhydric phenol, more preferably of a dihydric phenol, and one or more amines having per molecule at least one N—H function reactive with an epoxy group.

Component (a) has preferably the average formula

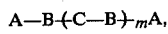
A—B(—C—B)$_m$A, wherein m is a number from 0 to 2, A is a group which is linked to B through a secondary or preferably a tertiary amino function and being derived from an amine having one secondary amino group and is preferably an alkanolamino group. C is a group which is linked to B through two tertiary amino functions and being derived from amine having one secondary amino group, and B is a group

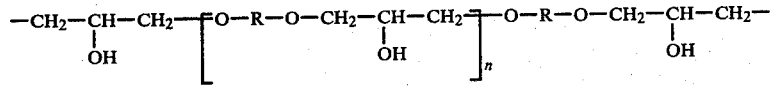

wherein n is a number from 0 to 4, and R is the hydrocarbon radical of a dihydric phenol. The group "B" is then derived from a diglycidyl ether having terminal

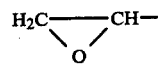

groups instead of the

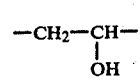

groups in the above formula; n is preferably from 1 to 3, preferably, from about 1.8 to 2.2, and R is preferably the radicals

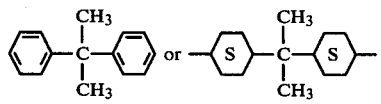

"A" is preferably derived from an amine having one secondary amino function but which may further have a variety of functional groups, provided that they do not substantially react with epoxy groups under the conditions of the addition reaction. Examples of such "latent" groups are hydroxyl groups, ketimine groups, and ester groups. Examples of suitable amines of this type are the dialkanolamines, in particular diethanolamine and di-isopropanolamine, and the diketimine of diethylenetriamine with methyl isobutyl ketone. However, group A may also be derived from an amine having more than one N—H function, provided that amines are used in large excess of N—H functions over epoxy groups.

Group "C" is derived from an amino compound having per molecule two N—H functions that are reactive with epoxy groups. These functions may be embodied in a single primary mono-amino function or in two secondary amino functions. Further, this amine may have other functions as well which react, hardly if at all, with epoxy groups, such as hydroxyl or tertiary amino groups. Examples are monoethanolamine, mono-isopropanolamine, 3-(N,N-di-methylamino)propylamine.

Part of the amines for making the adducts may even contain acidic groups, such as sulphanilic acid and amino carboxylic acids (aminobenzoic acid, glycine, alanine and glutamic acid), but such acidic amines are always to be used in combination with other adduct-producing amines and only in such amounts that the total amount of amino groups in the adduct is at least twice the amount of acidic groups. Built-in acidic groups in the amine adducts can be useful to accelerate certain curing reactions, such as with phenolic resins or with aminoplasts.

For the preparation of the amine adducts the diglycidyl ethers are preferably reacted with amines as described above in the ratio of one amino-hydrogen per epoxy group, in which reaction the amount of an amine having a single secondary amino group may vary from 33% to 100% of the available epoxy groups. If water-sensitive components such as amines substituted with ketimine groups are used, the reactions thereof with the glycidyl compound should be carried out under anhydrous conditions. Reaction of the amines with the diglycidyl ethers can be effected in one or more steps; thus a secondary amine may first be allowed to react with the diglycidyl ether and then an amine with the two reactive N—H functions added. Solvents such as glycol ethers or ketones can be used in the preparation of the adducts, but have to be removed from the product. The reaction temperature may be from about 70° to 140° C. and is preferably from about 70° to 120° C. It will be clear that the value for m is an average value and that this type of component (a) indicates a general structure of a mixture of reaction products.

It will be clear that the epoxy resin/amine adducts as described above have a plurality of alcoholic hydroxyl functions per molecule, at least part of these formed by the addition reaction of epoxy with an N—H function. Additional hydroxyl functions will be present when the amine and/or the epoxy resin starting materials already contain hydroxyl groups. The hydroxyl groups are suitable for crosslinking reactions during cure, and are further considered useful for stabilization of the aqueous suspensions.

Suitable as cross-linking component (b) are compounds or compositions having a plurality of groups which are reactive with alcoholic functions during cure. Well-known cross-linking agents of this type are phenolic resins, in particular resoles; aminoplast resins such as those derived from urea, melamine or benzoguanamine; blocked polyisocyanates; and combinations of (1) non-acidic polyesters of polycarboxylic acids which esters have more than one, and preferably at least two, beta-hydroxyl ester groups per molecule and (2) a transesterification-promoting metal compound.

Phenolic resins of the resole type contain methylol groups which may be etherified and which can react with hydroxyl groups of the epoxy resin/amine adduct; in addition cross-linking reactions can occur between the resole molecules therselves.

Aminoplast resins as used generally in thermosetting resin systems may be derived from urea, melamine, or benzoguanamine, and an aldehyde, usually formaldehyde, and generally etherified with a lower alcohol such as methanol, ethanol, or butanol. Suitable such resins are commercially available under such trade designations as CYMEL, BEETLE, etc.

Polyisocyanate derivatives to be used in aqueous thermosetting resin systems have to be blocked with a reactant that effectively blocks the isocyanate groups at temperatures used in the preparation of the system, and setting them free at curing temperatures, generally above 120° C. Examples of suitable blocking agents are monohydric alcohols, monohydric phenols and certain nitrogen compounds such as caprolactam.

Transesterification systems useful as component (b) are combinations of (1) non-acidic polyesters having more than one, and preferably at least two, beta-hydroxyl ester groups per molecule, and derived from a polycarboxylic acid, and (2) transesterification-promoting compounds. Beta-hydroxyl ester in this definition means that the carbon atom adjacent to the esterified hydroxyl has a free hydroxyl group; in other words the ester function is derived from a 1,2-glycol of which only one of the hydroxyl functions has been esterified. The glycol part may have substituents, such as alkyl, ether or stable ester groups. The beta-hydroxyl group is needed for sufficient cross-linking at acceptable temperatures within acceptable times, for example at temperatures up to 200° C. and curing times of up to 30 minutes. By the process of curing or stoving the coating, beta-hydroxyl ester groups of the polyester transesterify to the effect that ester bonds are formed between carboxyl groups of the polyester and hydroxyl groups of components (a) and optionally (c), with release of a glycol-type compound; the latter may then evaporate. The result is a cross-linked coating which is solvent-resistant and infusible. When, on the contrary, a polyester is used which does not contain beta-hydroxyl ester groups, but say simple alkyl ester groups, such as methyl, ethyl or butyl, the transesterification is too sluggish to effect sufficient cross-linking at acceptable conditions, and the stoved coating will not have acceptable solvent resistance. It can, for example, be easily rubbed away with a piece of cotton cloth soaked in methyl ethyl ketone (MEK). Suitable non-acidic polyesters having beta-hydroxylester groups can be prepared from a polycarboxylic acid or anhydride thereof, one or more glycols, and/or monoepoxides, for example from terephthalic acid, isophthalic acid, phthalic anhydride, trimellitic anhydride; ethylene glycol; ethylene oxide, propylene oxide. Examples of polyesters are bis(2-hydroxyethyl)-terephthalate and lower (2-hydroxyethyl)-terminated poly-alkyleneglycol terephthalates.

The transesterification-promoting metal compound is preferably a metal salt or complex that is soluble in liquid hydrocarbons, such as white spirit or xylene. A commercially available concentrated solution in such a solvent can then easily be homogeneously diluted with a part of one of the other binder components, to provide a master batch containing the accelerator. In view of the small amounts of accelerator needed in the final binder composition this technique is recommendable. Suitable salts meeting that requirement are in general 2-ethyl hexoates (octoates) and naphthenates. Further, when these metal salts or complexes are insoluble or substantially insoluble in water, potential adverse effects by leaching out of accelerator into the aqueous phase of the aqueous suspensions are avoided.

Very suitable in view of their generally high activity are, for example, salts of organic acids such as the octoates or naphthenates of lead, zinc, calcium, barium and iron(III). A suitable example of a metal complex is titanium acetyl acetonate. Other suitable salts, although in general less active than those mentioned above, are salts of tin(II), manganese, cobalt and dibutyltin dilaurate. Further, metal salts that can be mentioned in general are octoates and naphthenates of the alkali and earth alkali metals, of the lanthanides, and of zirconium, cadmium, chromium, and acetyl acetonate complexes of lead, zinc, cadmium, cerium, thorium and copper.

Mixtures of such salts and/or complexes can also be used. Some of the salts or complexes mentioned above are known as esterification and transesterification catalysts for the preparation of alkyd resins, epoxy resin esters, and linear polyesters for fibres, in general for the preparation of fusible polyesters which are soluble in organic solvents. However, the temperatures used there are generally far above 200° C., the reaction times at least some hours, and the amount of catalyst is usually very low, below 0.1% by weight of the polyester. None of these used indicated that these salts could be used as cross-linking accelerators in coatings, i.e., for the formation of insoluble, infusible polyester-like coatings, as in the present binder compositions.

In the present compositions these accelerating salts or complexes can be used in amounts of from about 0.1 to 5, preferably from about 1 to 3 percent of the combined weights of the polyester and of component (a) and optionally (c). In view of the varying metal content of available metal salts or complexes or solutions thereof the amount of catalyst is more conveniently indicated by the metal content in the compositions; metal contents of 0.3 to 1.0 percent by weight are suitable in general, and metal contents of 0.5 to 0.8 percent by weight are preferred.

Other transesterification-promoting metal compounds that can be used in the present compositions are certain metal salts and oxides that are insoluble in liquid hydrocarbons, such as the pigments lead silicate, red lead ($Pb_3O_4$), zinc chromate, zinc tetraoxydichromate, and lead silico chromate, and also antimony trioxide, and acetates, formiates and carbonates of Pb, Zn, Fe, Li, Cd and Bi. The quantity of the pigments needed is sometimes such as to exclude their use when the pigmentation they will provide (e.g., yellow or red) is not desired. These pigments may sometimes provide the desired transesterification activity in pigment/binder weight ratio from 0.1 upwards. A primary screening for suitability as transesterification accelerator comprises the dry-grinding together to a particle size below 2 mm of a binder mixture of adduct according to example I(a) with bis(2-hydroxyethyl)terephthalate in weight ratio 80/20 with the compound to be tested as accelerator, and subjecting the mixture to a gelation test on a hot plate at 180° C. The mixture without accelerator will have gelation times of 600 seconds or more, whereas satisfactory cure can be expected at gelation times of 400 seconds and below.

Optionally the binder composition may also contain as component (c) a polyepoxide, which is preferably a polyglycidyl ether of a dihydric phenol. Preferred polyepoxides are polyglycidyl polyethers of 2,2-(4-hydroxyphenyl)propane having a weight per epoxy (WPE) of from about 700 to 1200, in particular, from about 750 to 1000.

The relative amounts of the components (a), (b) and (c) will depend on the requirements for each of the specific types selected, and also on the physical properties of each component.

In view of the preparation methods and storage requirements the blend of (a), (b) and optionally (c) has preferably a softening point of at least 70° C., and it is preferred that major binder components have softening points above that temperature.

The weight ratio of the binder components (a), (b) and optionally (c) can vary between wide limits, in dependence of the reactivity of the components, the desired cure schedule, and the desired properties of the cured coating; the optimum ratio of (a) plus optionally (c) to (b) for a chosen set of components can be determined experimentally as usual; as a general guide line that weight ratio can be in the range of from 95:5 to 50:50, and more particularly from 90:10 to 60:40.

Component (c) may be absent, or may be present in small to relatively large amounts with respect to component (a), provided that its presence does not interfere with the stability of the aqueous dispersion. Weight ratios of (c) to (a) from 0:100 to 90:10 may be considered, in particular from 0:100 to 50:10, for example from 0:100 to 20:100.

The final paint composition may contain, apart from the binder, other components usual in paints, such as pigments, fillers, thixotropic agents, stabilizers, disinfectants and the like.

The aqueous powder suspensions according to the invention are preferably prepared by first blending the solids components intimately, and then milling this blend in at least ⅔ times its weight of water to a particle size below 20 micrometer.

The intimate blending is preferably carried out in a manner as known in the art for making powder paints, which include dry blending of the crushed binder components with other solid components such as pigments and fillers, followed by a quick fusion blending, preferably in an extruder, slightly above the softening point of the binder, cooling, and crushing the cooled extrudate, with optionally fine grinding and sieving. This way of intimate blending has the advantage that the final aqueous paint dispersions have an improved stability. If, for example, only the epoxy resin/amine adduct of Example I(a) is milled in an equal weight of water to a particle size below 20 micrometer, a thin, stable aqueous suspension is obtained. However, when cross-linking agents are added to that suspension, it usually flocculates or thickens to such a point that the combination cannot be used anymore as a paint.

The water to be used for making the aqueous powder suspensions is preferably purified, by distillation or demineralization, and may contain suitable additives such as desinfecting agents.

When the aqueous suspensions have been milled down to a particle size below 20 micrometer the average particle size will be considerably lower, and presence of a substantial amount of micro-fine particles will improve the stability of the suspensions. The stability can be further improved, if desired, by addition of thixotropic agents such as micro-fine silica and the like, which may be added after the aqueous suspension has been milled down to a certain degree, and may be dispersed therein by simple stirring.

The amount of water used for making the suspensions may be low, and is in general at least ⅔ times the weight of the solid blend so that the suspensions may have solid matter contents of 60%w or below. Concentrated suspensions may be used for high-solids coatings, or may be stored and diluted further with water before use, to obtain a suspension with a desired solid matter content, or a desired viscosity.

Agents which regulate the pH may be added to the suspensions, and of course it is possible to add such amounts of acids as will make the suspensions suitable for application by cathodic electrodeposition.

The aqueous suspensions may be applied to a substrate by means known in the art, such as be brush or roller, or by spraying or dipping and the like onto a variety of materials, preferably on metals such as bare steel, phosphated steel, zinc, tin plate (as a can lacquer), as the case may be as the sole coating layer, or as a primer or top-coat e.g., on a primer layer applied by electrodeposition.

The water may evaporate and the coating cured by usual means, such as by stoving or by heat radiation. Stoving time and temperature will be dependent on the particular binder combination, and will be in a range usual for thermosetting surface coatings, in general from 140° C. to 200° C. with curing times varying from 10 to 30 minutes.

The invention is illustrated by examples. Parts and percentages therein are by weight, unless stated otherwise, or apparent from the context. Analytical data (amino, epoxy, hydroxyl) for the paints, the binder, or the components are based on non-volatile matter. It will be appreciated that the examples are mere embodiments and are given for the purpose of illustration only and the invention is not to be regarded as limited to any specific components and/or specific ingredients recited therein.

Polyethers D1, D2 and 1055 are commercial polyglycidyl ethers of 2,2-bis(4-hydroxyphenyl)propane having a WPE of 499, 472, 800–900, respectively. Polyether 1055 has a melting point (Kofler) between 80° and 100° C.

Melamine resin SKW 250 is a solid commercial melamine resin developed for powder coating compositions.

Phenolic resin 722 is a commercial product.

"MEK rubs" is the number of rubs to be given to the cured coating with a cloth wetted with methyl ethyl ketone until the coating begins to swell or to disintegrate. "MEK rubs">50 is indicative for good cure and good solvent resistance.

EXAMPLE I

Preparation of epoxy resin/amine adducts (A) Epoxy resin/amine adduct (KK1).

Polyether D1 (2000 parts, 4 epoxy equivalents) is melted at 120° C., and a mixture of monoethanol amine (61 parts, 1 mole) and diethanol amine (210 parts, 2 mole) is added with stirring in about 15 minutes. The temperature rises to about 150° C. After 10 minutes further heating the hot liquid adduct is poured onto aluminum foil and allowed to cool. The residual epoxy content of the solid brittle adduct was below 0.01 meq/g.

(B) Epoxy resin/amine adduct having built-in sulphonic acid groups (KK2).

Polyether D1 (2000 parts, 4 epoxy equivalents) is melted at 125° C., and a liquid mixture of diethanol amine (210 parts, 2 mole), sulphanilic acid. 1 aq (191 parts, 1 mole), and water (200 parts) is added slowly with stirring. The temperature rises to about 150° C. while water boils off. After 10 minutes further heating the hot liquid adduct is poured onto aluminum foil and allowed to cool. The epoxy content of the solid brittle adduct was below 0.01 meq/g.

(C) Epoxy resin amine adduct similar to KK1.

Preparation (A) was repeated, with slight differences. Polyether D2 (1888 parts, 4 epoxy equivalents) is melted and reacted with a mixture of monoethanol amine (61 parts, 1 mole) and diethanol amine (210 parts, 2 mole) at 140°–145° C. during 3 hours. The hot liquid adduct is poured onto aluminum foil and allowed to cool. The solid brittle adduct had a residual epoxy content below 0.01 meq/g; the calculated hydroxyl content was 0.67 eq/100 g, and the calculated molar weight 2160.

EXAMPLE II

Preparation of bis(2-hydroxyethyl) terephthalate

Terephthalic acid (996 parts, 6 mole), ethylene glycol (2232 parts, 36 mole) and dibutyltin oxide (9 parts) were heated at 190°–195° C. during 6 hours while distilling off the water and some ethylene glycol. The mixture was cooled to 60° C. with stirring to initiate crystallization of the ester, and then poured into ice water (5 liters). The ester was filtered off, washed twice with water and dried at 60° C. The product had melting point 100°–105° C.; residual acid content 0.017 meq/g.

EXAMPLE III

Aqueous powder suspensions with melamine resin (A) To obtain a first impression with regard to viscosity and stability two aqueous suspensions were made as follows:

A mixture of epoxy resin/amine adduct KK1 (405 parts), polyether 1055 (45 parts) and melamine resin SKW 250 (50 parts) was coarsely ground, homogenized in an extruder at 95°–100° C. extrudate temperature, cooled and ground coarsely to a particle size about 75 micrometer; the blend was dispersed in 1½ times its weight of demineralized water in a high-speed ball mill during 10 minutes. The resulting aqueous powder slurry (particle size <20 micrometer) had a low viscosity; it could be poured out easily, did not thicken or flocculate upon standing, could be diluted with more water to give a stable suspension, and at the appropriate viscosity it could be applied as a coating on degreased steel panels by spraying. The experiment was repeated, with the differences that pigments were added to the initial mixture: titanium dioxide (200 parts) and barium sulphate (200 parts) and that the coarse blend was dispersed in an equal weight of water. The resulting aqueous dispersion was equally stable (particle size <20 micrometer).

(B) Aqueous powder suspension and evaluation of the coating

The procedure of (A) was repeated, with the difference that the amine adduct KK1 was replaced by an equal weight of the adduct KK2. This adduct has a built-in acidic catalyst, which can be expected to improve the curing.

Aqueous suspensions with and without pigmentation (same as at (A)) were made. The suspensions (particle size <20 micrometer) had low viscosity, and were stable; then did not thicken on standing, and could be diluted easily with water.

The aqueous suspensions were sprayed onto degreased steel panels, which were then stoved at 200° C. during 20 minutes. The pigmented and unpigmented coatings (thickness 40-45 micrometer) had excellent adhesion (GT 0), very good solvent resistance (MEK rubs >50) and a good flexibility (Erichsen slow penetration 5 mm).

EXAMPLE IV

Aqueous suspensions with phenolic resin

In the same manner as in Example III aqueous powder suspensions were prepared from the following components:

(A) unpigmented:
KK1 (315 parts), KK2 (315 parts, polyether 1055 (70 parts), phenolic resin PR 722 (300 parts).

(B) pigmented:
KK1 (200 parts), KK2 (200 parts), polyether 1055 (44 parts), phenolic resin PR 722 (111 parts), titanium dioxide pigment (222 parts) and barium sulphate filler (222 parts).

(C) pigmented:
KK1 (175 parts), KK2 (175 parts), polyether 1055 (39 parts), phenolic resin PR 722 (166 parts), titanium dioxide (222 parts), barium sulphate (222 parts).

The aqueous dispersions had a low viscosity; they were stable, did not thicken on standing, and could be diluted easily with water.

The aqueous dispersions were sprayed onto degreased steel panels which were then stoved at 200° C. during 20 minutes. The coatings (thickness 40-45 micrometer) had excellent adhesion (GTO) and solvent resistance (MEK rubs >50); the coating from formulation (C) had a good impact resistance (56 cm.kg) and flexibility (Erichsen slow penetration 6.5 mm). The gelation times at 180° C. for formulations (A), (B), and (C) were 240, 277 and 165 seconds, respectively; gelation times of this order indicate satisfactory initial cure.

EXAMPLE V

Aqueous powder suspensions with beta-hydroxyalkyl polyester cross-linking systems (A) In the same manner as in Example III aqueous powder suspensions were prepared from the components:

Epoxy resin/amine adduct KK1, preparation see Example I(a).
Polyester: bis(2-hydroxyethyl)terephthalate, preparation see Example II.
PB-octoate: in all experiments the Pb-content was 0.66%w on binder; the commercial product used has Pb-content 33%w and was added from a 10%w masterbatch in KK1.
$TiO_2$: pigment.
$BaSO_4$: filler.

The procedure was as in Example III. Solids content unpigmented 40%w, pigmented 50%w. The aqueous powder dispersions were stable, had a low viscosity, and could be easily diluted with water. The suspensions were sprayed onto degreased steel panels which were stoved at 200° C. during 20 minutes. Compositions and evaluation results are collected in Table I.

TABLE I

| Dispersion No. | KK1 g | Polyester g | $TiO_2$ g | $BaSO_4$ g | Gel time sec/180° C. | Adhesion GT | Impact cm.kg | Slow penetration mm | MEK rubs |
|---|---|---|---|---|---|---|---|---|---|
| A1 | 720 | 260 | — | — | 230 | 0 | 90 | 8.9 | 50 |
| A2 | 660 | 320 | — | — | 220 | 0 | 90 | 9.0 | 50 |
| A3 | 430 | 110 | 222.5 | 222.5 | 340 | 0 | 90 | 7.5 | 50 |
| A4 | 400 | 144 | 222.5 | 222.5 | 300 | 0 | 90 | 6.8 | 50 |
| A5 | 367 | 178 | 222.5 | 222.5 | 275 | 0 | 90 | 6.8 | 50 |

The cured coatings (thickness 40-45 micrometer) had a good appearance; the evaluation results demonstrate a good rate of cure (gel time), excellent adhesion (GT=Gitterschnitt; scale: 0=excellent; 5=bad), excellent impact resistance and flexibility and very good solvent resistance (MEK rubs).

(B) In a similar manner as in Example III an aqueous powder suspension was made as follows:

Epoxy resin/amine adduct according to Example I(C) (1600 parts) was coarsely ground to a particle size of about 2 mm, and dry-blended with the polyester of Example II (400 parts), titanium dioxide (320 parts), calcium carbonate (480 parts), zinc oxide (480 parts), zinc chromate (320 parts), and a commercial acrylate-type flow control agent (10 parts). The blend was homogenized in an extruder (barrel temperature 90° C., screw temperature 40° C., screw speed 40 rpm). The extrudate (50° C.) was cooled to room temperature, ground, and sieved to a particle size <75 micrometer. The yellow powder could be used for powder coating (cure schedule 180° C./20 minutes, dry film thickness 55-60 micrometer) providing a cured coating with excellent properties, but was further used to make an aqueous dispersion by milling with an equal weight of water in a high-speed ball mill during 10 minutes to obtain an aqueous powder slurry having particle size <20 micrometer. This slurry was reasonably thin, stable, and could be easily diluted with water; 5%w water was added to adjust the viscosity and the slurry was then sprayed onto degreased steel panels, using a normal spray gun at air pressure 5 atm. After a flash-off time of 15 minutes the panels were stoved at 180° C. during 20 minutes. The cured yellow coatings had properties as follows:

appearance: good,
thickness: 40-45 micrometer;
adhesion (Gitterschnitt) GT 0;
xylene immersion (15 minutes/22° C.): unaffected;
impact resistance: >90 cm.kg;
hardness (Konig): 180 seconds.

The values were essentially the same as for the coatings applied by powder coating, and demonstrate how the technique of aqueous slurry coating can be used with suitable binder compositions without any use of surfactants, and with application by usual paint equipment. The zinc chromate in this composition has two functions: it is a pigment (yellow), and it is a catalyst for the cure of the epoxy resin/amine adduct with the polyester by a tranesterification mechanism. When the zinc chromate was replaced by an equal weight of zinc oxide, the composition did not harden at acceptable cure schedules.

What is claimed is:

1. An aqueous coating powder suspension containing no surfactant and no addition of acid wherein the powder particles comprise an intimate mixture of binder components comprising:
   (a) an epoxy resin/amine adduct which is essentially insoluble in water and having terminal amino groups and a plurality of alcoholic hydroxyl groups,
   (b) a cross-linking component, and, optionally,
   (c) a solid polyepoxide, said mixture having a softening point of at least 70° C. and a particle size in the suspension being essentially below 20 micrometers.

2. The aqueous suspension of claim 1 wherein component (a) is an adduct of a polyglycidyl ether of a polyhydric phenol and one or more amines, each amine having at least one N—H function reactive with an epoxy group.

3. The aqueous suspension of claim 2 wherein component (a) is derived from a polyglycidyl ether of a dihydric phenol.

4. The aqueous suspension of claim 3 wherein component (a) is a compound having the average formula:

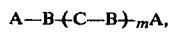

wherein m is a number from 0 to 2, A is a group which is linked to B through a secondary or tertiary amino function and being derived from an amine having one secondary amino group, B is a group

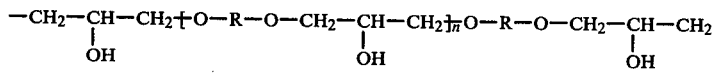

wherein n is a number from 0 to 4, R is the hydrocarbon radical of a dihydric phenol, and C is a group which is linked to B through two tertiary amino functions and being derived from an amine containing at least two secondary amino groups.

5. The aqueous suspension of claim 4 wherein A is a dialkanolamino group.

6. The aqueous suspension of claim 4 wherein component (a) is an adduct of a polyglycidyl ether of 2,2-bis(4-hydroxyphenyl)propane, monoethanolamine and diethanolamine.

7. The aqueous suspension of claim 1 wherein component (b) is selected from the group consisting of a melamine resin, a phenolic resin, and a transesterification system which is a combination of (1) a non-acidic polyester of a polycarboxylic acid the ester having more than one betahydroxyl ester group per molecule and (2) a transesterification-promoting metal compound.

8. The aqueous suspension of claim 1 wherein component (c) is a polyglycidyl ether of 2,2-bis(4-hydroxyphenyl)propane having a weight per epoxy of from about 700 to 1200.

9. A process for the preparation of an aqueous coating powder suspension as in claim 1 comprising the steps of (1) intimately blending the solid components and (2) milling the blend in at least ⅔ times its weight of water to a particle size below about 20 micrometers.

* * * * *